United States Patent
Martens

(10) Patent No.: US 8,473,973 B2
(45) Date of Patent: Jun. 25, 2013

(54) RECORDABLE OPTICAL RECORD CARRIER

(75) Inventor: Hubert Cécile François Martens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1358 days.

(21) Appl. No.: 10/563,935

(22) PCT Filed: Jul. 2, 2004

(86) PCT No.: PCT/IB2004/051100
§ 371 (c)(1), (2), (4) Date: Jan. 9, 2006

(87) PCT Pub. No.: WO2005/006318
PCT Pub. Date: Jan. 20, 2005

(65) Prior Publication Data
US 2006/0156325 A1  Jul. 13, 2006

(30) Foreign Application Priority Data
Jul. 11, 2003 (EP) .................................... 03102114

(51) Int. Cl.
*G11B 7/007* (2006.01)
*G11B 7/246* (2006.01)
*G11B 7/24* (2006.01)

(52) U.S. Cl.
USPC ........................... 720/718; 369/94; 369/275.4

(58) Field of Classification Search
USPC ................. 720/718; 369/94, 275.4, 283, 284, 369/286, 288
See application file for complete search history.

(56) References Cited

U.S. PATENT DOCUMENTS

| | | | |
|---|---|---|---|
| 5,213,859 A | 5/1993 | Aoi et al. | |
| 5,669,995 A * | 9/1997 | Hong | 369/94 |
| 5,676,854 A | 10/1997 | Inui et al. | |
| 5,757,758 A * | 5/1998 | Yagi et al. | 369/112.25 |
| 5,914,926 A | 6/1999 | Maeno et al. | |
| 5,986,997 A * | 11/1999 | Challener, IV | 369/121 |
| 6,028,836 A | 2/2000 | Kosuda et al. | |
| 6,434,107 B1 | 8/2002 | Artigalas et al. | |

(Continued)

FOREIGN PATENT DOCUMENTS

| EP | 1067535 A2 | 1/2001 |
|---|---|---|
| EP | 1174869 A2 | 1/2002 |

(Continued)

OTHER PUBLICATIONS

ISR for Publication, International Publication No. WO2005/003318.

*Primary Examiner* — Will J Klimowicz

(57) ABSTRACT

The present invention relates to a recordable optical record carrier for recording information using a radiation beam having wavelength λ and incident on an entrance surface of the optical record carrier comprising, in this order: a protective layer facing the entrance surface; first recording stack (L0), the recording stack comprising a recording layer of an organic dye material and a groove structure; a transparent spacer layer sandwiched between the neighboring recording stacks; and a second recording stack (LN) comprising a recording layer, wherein the groove depth of the recording layer of the first recording stack (L0) is in a range from $0.241*\lambda/n_S$ to $0.362*\lambda/n_S$, where $n_S$ is a refractive index of a material in a land between grooves on the groove structure.

20 Claims, 4 Drawing Sheets

U.S. PATENT DOCUMENTS

Figure 1:
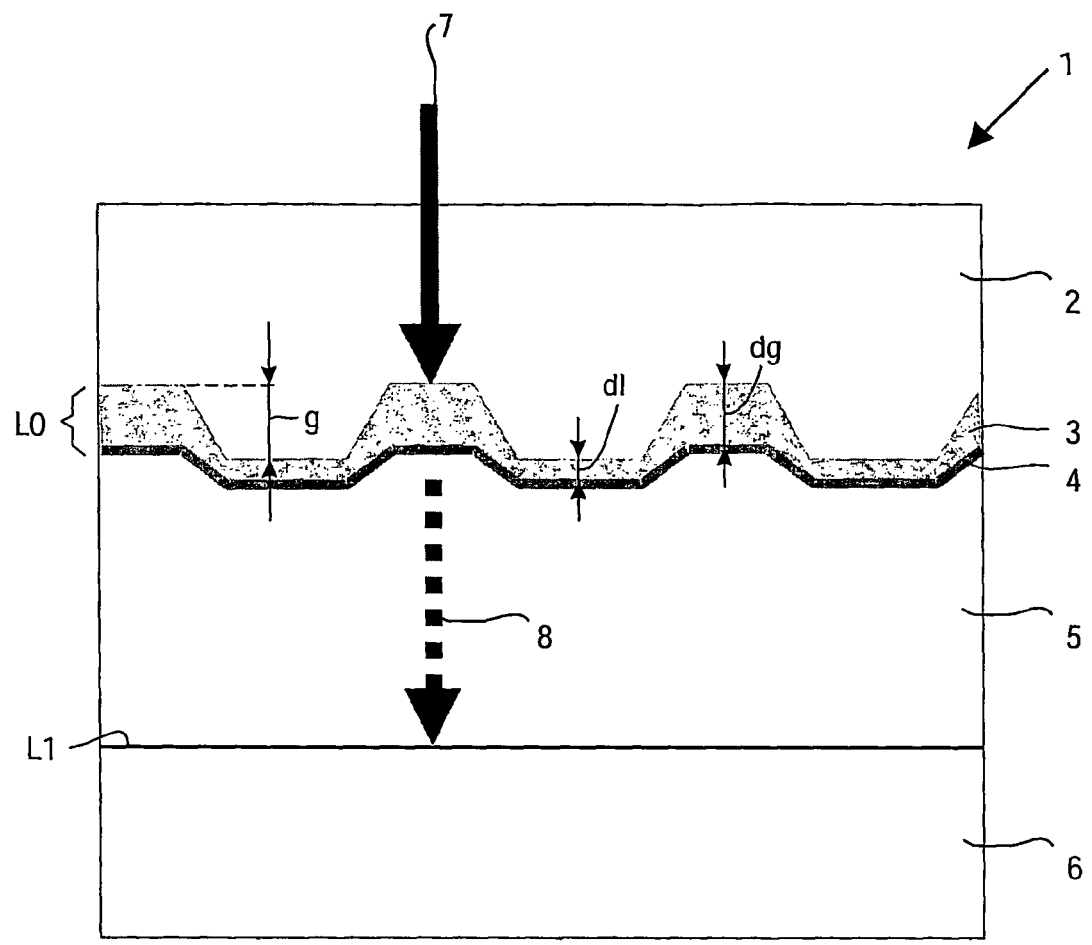

| | | |
|---|---|---|
| 6,451,402 B1 | 9/2002 | Nee |
| 6,764,735 B2 * | 7/2004 | Nee .................... 428/64.1 |
| 7,221,642 B2 * | 5/2007 | Martens et al. ........... 369/275.4 |
| 2002/0039346 A1 * | 4/2002 | Abe et al. ................ 369/275.4 |
| 2002/0122913 A1 * | 9/2002 | Nee .................... 428/64.4 |
| 2003/0031954 A1 * | 2/2003 | Kakuta et al. ............ 430/270.2 |
| 2004/0076907 A1 * | 4/2004 | Inoue et al. ............. 430/270.12 |
| 2005/0042545 A1 * | 2/2005 | Tieke et al. ............. 430/270.11 |
| 2005/0063295 A1 | 3/2005 | Muramatsu et al. |

FOREIGN PATENT DOCUMENTS

| | | | |
|---|---|---|---|
| JP | 09115181 A * | 5/1997 | |
| JP | 11031337 A | 2/1999 | |
| JP | 11066622 A | 3/1999 | |
| JP | 11195242 A | 7/1999 | |
| JP | 20000311384 A | 11/2000 | |
| JP | 2001023237 A | 1/2001 | |
| JP | 2001250265 A * | 9/2001 | |
| JP | 2002279696 A | 9/2002 | |
| JP | 2003025726 A | 1/2003 | |
| JP | 2003178489 A * | 6/2003 | |
| JP | 2003178490 A * | 6/2003 | |
| WO | 03003361 A1 | 1/2003 | |
| WO | 03060894 A1 | 7/2003 | |
| WO | 03083845 A1 | 10/2003 | |

* cited by examiner

RECORDABLE OPTICAL RECORD CARRIER

The present invention relates to a recordable optical record carrier, in particular to a multi-layer (e.g. dual-stack) optical record carrier for recording information.

At present, a number of different optical record carriers are on the market. Among them write-once optical record carriers are available such as CD-R or DVD+R record carriers having 650 MB and 4.7 GB recording capacity respectively. Recently a dual-layer DVD+R record carrier has been proposed that increases the recording capacity to 8.5 GB. In such a dual-layer disc two recording stacks are present. The upper recording stack, being closer to the light source during recording and commonly denoted as L0 recording stack, of a dual-layer write-once DVD, often denoted as DVD+R-DL, should combine a high transparency with a finite reflection. The high transparency of the upper recording stack L0 is required in order to enable reading and writing of the lower recording stack L1. Several different stack designs have been examined that could be used for this purpose and a number of experiments have been performed. With a number of different stack designs good recording results and a sufficiently high transmission, in some embodiments up to 57%, has been obtained, but the reflection turned out to be too low, in some embodiments being only 13 to 15%. In other embodiments a sufficient reflection, for instance 17 to 20%, was achieved, but such embodiments showed too low transmission of only 45%.

It is preferred that a recorded dual-layer DVD+R medium is compatible with the already existing dual-layer DVD-ROM standard, because this will allow playback of recorded DVD+R-DL media on existing DVD players. To achieve this compatibility, the effective reflectivity of both the L0 and L1 recording stack should be at least 18%. This implies that for L0 the reflection should be at least 18% and the transmission should be preferably at least 55%. Even if compatibility with the existing dual-layer DVD-ROM is not required it should be realized that a high reflection and high transmission of L0 is very advantageous because the high reflection yields good read-out signals from L0 while the high transmission yields a higher effective reflection from L1 and thus good read-out from L1, and further the high transmission reduces the effective write-power required for L1. For reliable read-out the reflection of L0 should be at least 15% and the transmission should be at least 55%.

U.S. Pat. No. 5,676,854 discloses an optical memory having a CD-like (non-transparent) magneto-optical recording layer. By setting the groove depth in the range of 80 nm to 100 nm and setting the groove width in the range of 0.3 μm to 0.4 μm as well as by decreasing in the width of a land at each edge to 0.2 μm in maximum it is possible to obtain a track crossing signal with intensity sufficient for performing an access operation to a target track and to obtain an improved reflectance at a land resulting in an improved C/N and recording density.

Further, international patent application PCT/IB03/00090 (PHNL030043) describes how transmission and reflection of L0 in DVD+R-DL can be optimized via the stack-design, in particular for recording stacks with a dye recording layer and a thin metal layer. However, the improvement of reflection goes at the cost of transmission. From this description it becomes clear that the typical route to optimize reflection (and transmission) in dye-based optical recording media is via the stack-design.

It is an object of the present invention to provide a recordable optical record carrier comprising at least a dye recording layer and, preferably, a thin metal layer having an improved reflection and transmission, at least for the L0 recording stack.

This object is achieved according to the present invention by a recordable optical record carrier for recording information using a radiation beam having wavelength λ and incident on an entrance surface of the optical record carrier comprising, in this order:
  a protective layer facing the entrance surface,
  a first recording stack (L0), said recording stack comprising a recording layer of an organic dye material and a groove structure,
  a transparent spacer layer sandwiched between neighboring recording stacks, and
  a second recording stack (LN) comprising a recording layer,
  wherein the groove depth of the recording layer of the first recording stack (L0) is in a range from $0.241*\lambda/n_S$ to $0.362*\lambda/n_S$, where $n_S$ is a refractive index of a material in a land between grooves on the groove structure.

The invention is based on the finding that both reflection and transmission can be improved simultaneously by optimizing the groove depth. While U.S. Pat. No. 5,676,854 discloses an improvement of reflectance at a land for a magneto-optical record carrier having a non-transparent recording stack by decreasing the groove depth, it could not be expected that a decrease of the groove depth of the recording layer of at least the first recording stack (L0) of an optical record carrier according to the DVD+R standard (where λ=655 nm) to a value in the range from 100 to 150 nm would at the same time lead to an improved transmission for a transparent recording stack having a recording layer of an organic dye material. It should be clarified that width and depth are mechanical values and that λ is a radiation wavelength in vacuum.

However, it has been found, that a reflection of 18% or more ensuring a sufficient read-out signal and a transmission of 55% or more enabling the read-out of deeper recording layers can be obtained according to the present invention. The increase in both reflection and transmission is caused by the fact that for less deep grooves less diffraction occurs. Obviously, the highest reflection occurs at a flat surface. For the shallowest grooves, the transmission decreases somewhat since the resulting increase of dye thickness on land yields additional absorption thus lowering the transmission.

Preferred embodiments of the invention are defined in the dependent claims. While generally the groove depth of the recording layer of the first recording stack (L0) should be in a range from $0.241*\lambda/n_S$ to $0.362*\lambda/n_S$, a preferred range is from $0.289*\lambda/n_S$ to $0.337*\lambda/n_S$. A preferred groove width of the recording layer of the first recording stack (L0) is in a range from $0.198*\lambda/NA$ to $0.397*\lambda/NA$, in particular in a range from $0.289*\lambda/NA$ to $0.347*\lambda/NA$, where NA is a numerical aperture of the radiation beam incident on the optical record carrier.

According to another embodiment the optical record carrier is further comprising at least one additional recording stack between the protective layer and the second recording stack (LN), said additional recording stack comprising a recording layer of an organic dye material and a groove structure; and transparent spacer layers sandwiched between the neighboring recording stacks, wherein the groove depth of the recording layer of at least one of said additional recording stacks is in a range from $0.241*\lambda/n_S$ to $0.362*\lambda/n_S$. Again, while generally the groove depth of the recording layer of the at least one of said additional recording stacks should be in a range from $0.241*\lambda\lambda/n_S$ to $0.362*\lambda/n_S$, a preferred range is $0.289*\lambda/n_S$ to $0.337*\lambda/n_S$ and a preferred groove width of the recording layers of at least one of said additional recording stacks is in a range from $0.198*\lambda/NA$ to $0.397*\lambda/NA$, in particular in a range from $0.289*\lambda/NA$ to $0.347*\lambda/NA$.

It is further advantageous if the recording stacks, beside the recording layer, include a metal reflective or heat-sink layer on a side of the recording layer facing away from the light source during recording of data, which metal reflective or heat-sink layer being provided for efficient cooling of the adjacent recording layer after being hit by the recording beam. Such metal reflective or heat-sink layers are generally known and will therefore not be discussed further here. Preferred materials are Ag, Al, Au or Cu and the thickness lies preferably in a range below 40 nm, in particular below 25 nm.

A preferred thickness of the recording layer at a groove position of at least one recording stack is in a range from $0.168*\lambda/n_r$ to $0.336*\lambda/n_r$, in particular in a range from $0.235*\lambda/n_r$ to $0.302*\lambda/n_r$, where $n_r$ is a refractive index of the recording layer.

An even further increase of reflection and transparency of at least the first (L0) recording stack can be achieved in a further embodiment of the invention according to which the recording layer of at least the first recording stack shows a leveling ratio in a range from 0.3 to 0.5, in particular in a range from 0.35 to 0.40, said leveling ratio being defined as the difference between the thickness of said recording layer at a groove position and the thickness of said recording layer at a land position normalized by the groove depth. It has been found that for increased leveling ratios the reflection increases in the range of practical groove depths, that the transmission decreases in this same groove depth range, that the optimum transmission shifts to shallower groove depths, that the optimum modulation shifts to deeper grooves, that the groove depth range for optimum modulation broadens, and that the maximum modulation decreases. Leveling can also be applied in other recording stacks using a leveling ratio in the same range as for the first recording stack.

The invention can be applied not only to a dual-layer record carrier, but also in a multi-layer record carrier having more than two recording stack separated by spacer layers sandwiched in between.

Furthermore, although the invention is further explained by using the DVD+R system as an example, it will be apparent to those skilled in the art that the invention may be applied to alternative optical recording systems.

Figure 2A:
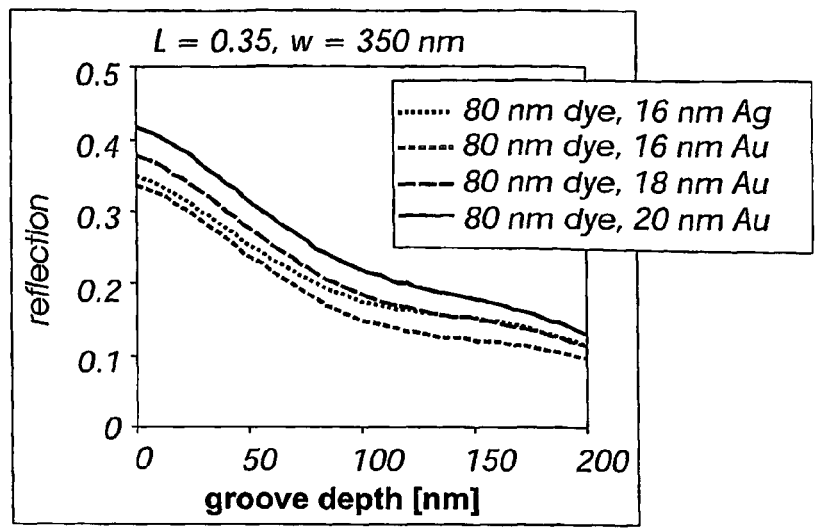
Figure 2B:
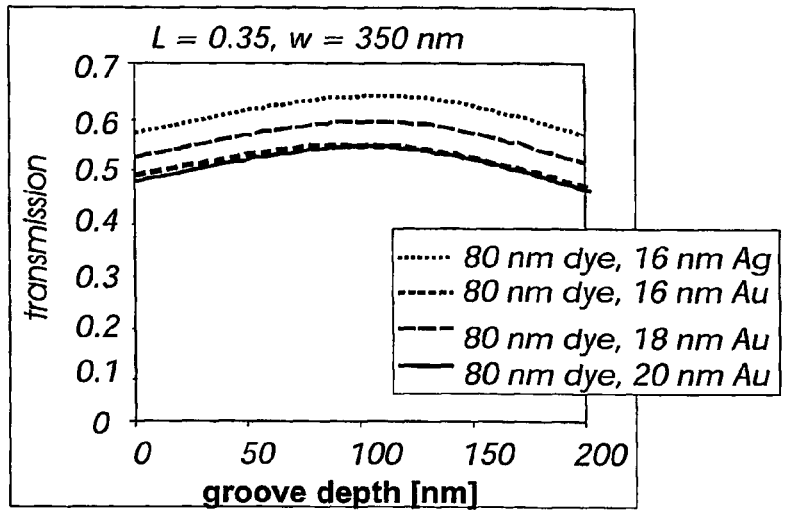
Figure 2C:
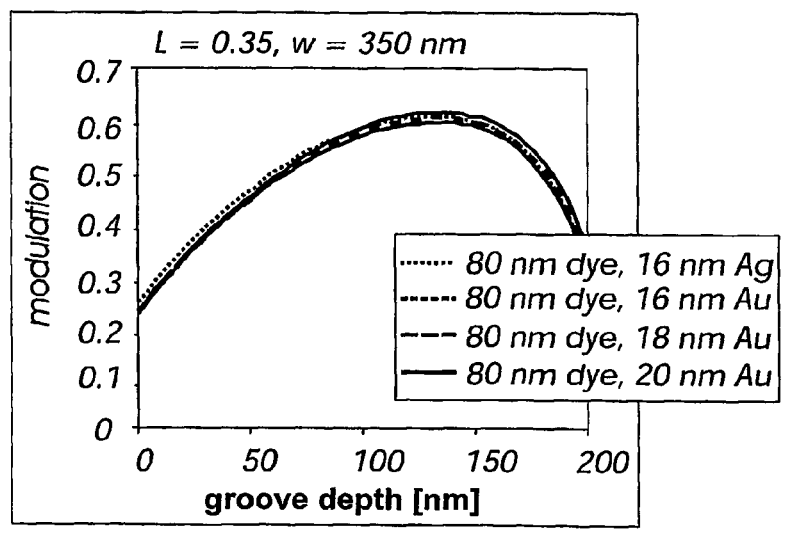
Figure 3A:
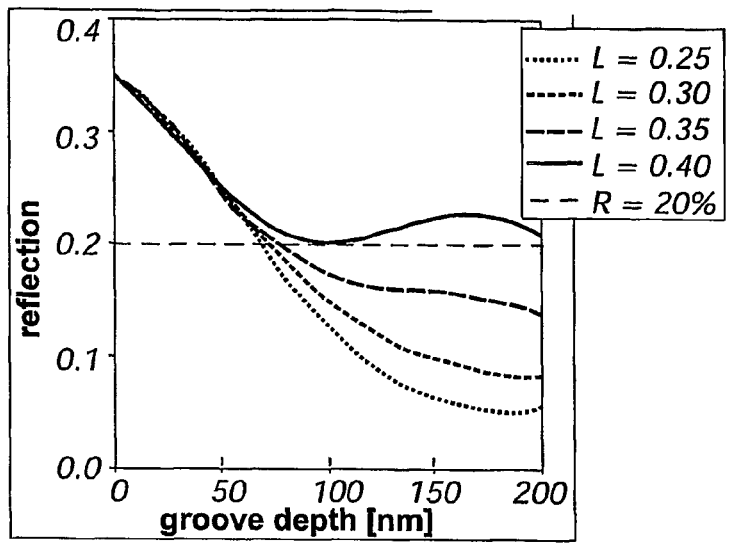
Figure 3B:
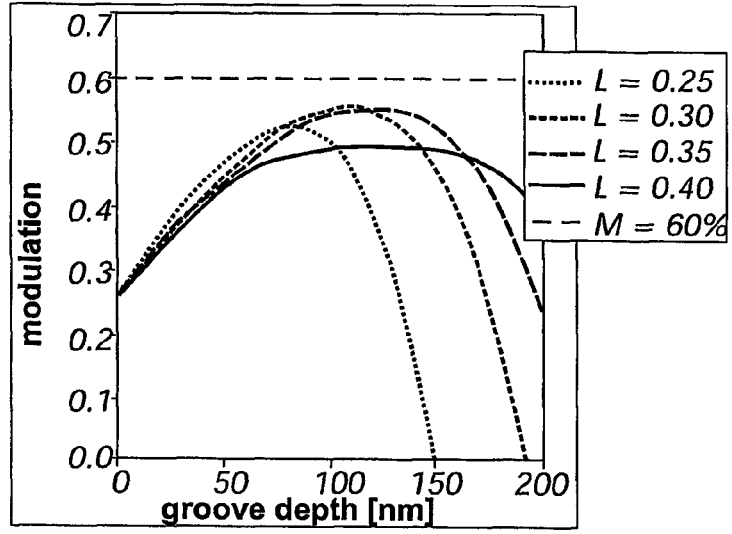
Figure 3C:
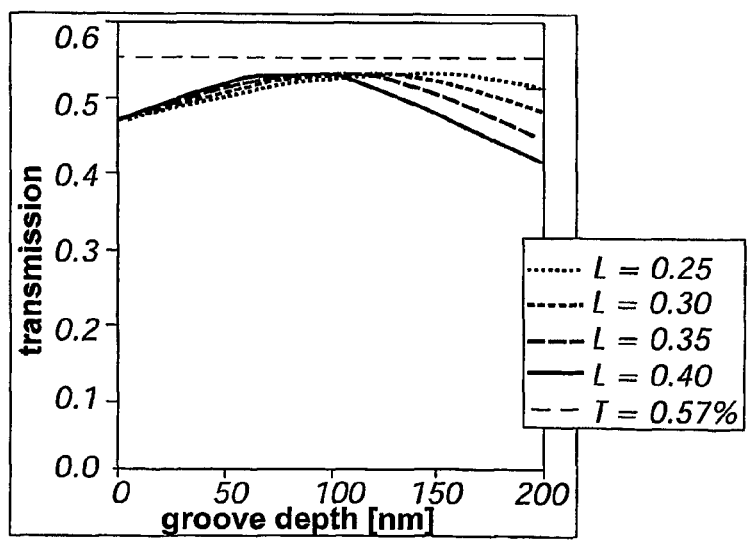
Figure 4A:
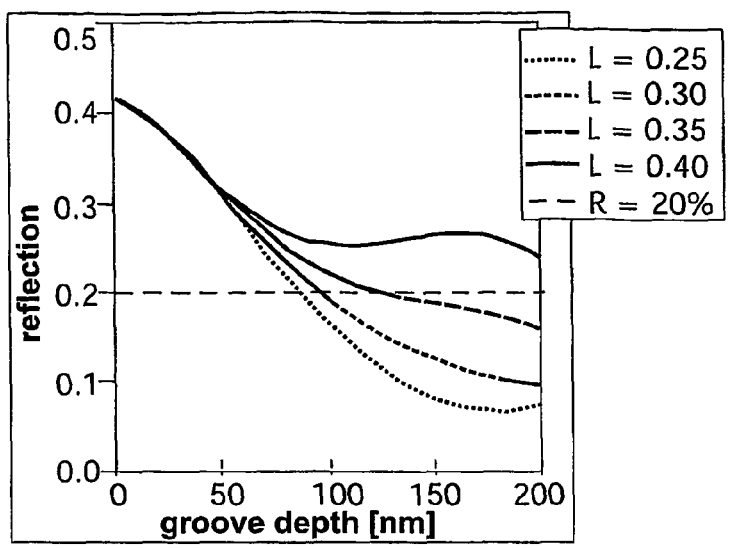
Figure 4B:
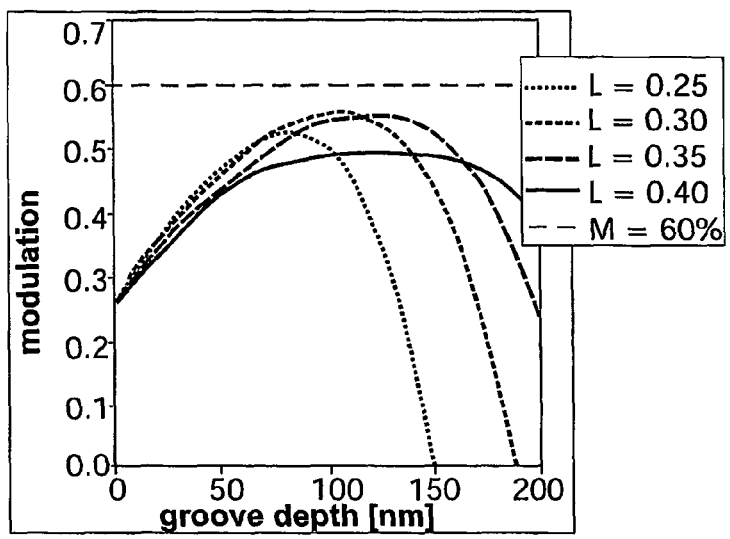
Figure 4C:
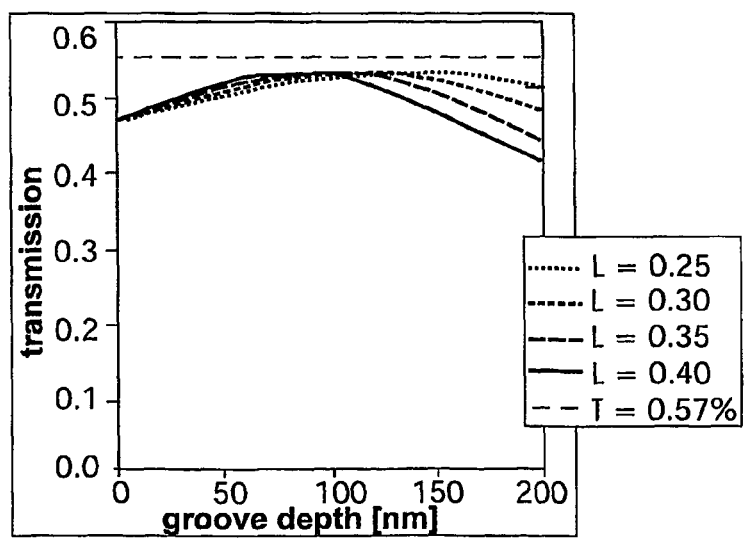

The invention will now be explained in more detail with reference to the drawings in which FIG. 1 shows an embodiment of a record carrier according to the present invention, FIG. 2 shows diagrams for reflection, transmission and modulation for different L0 stack designs as a function of the groove depth, FIG. 3 shows diagrams of reflection, modulation and transmission as a function of groove depth for different values of leveling and FIG. 4 shows diagrams of reflection, modulation and transmission as a function of groove depth at different values of leveling for another stack design as FIG. 3.

FIG. 1 shows the layout of a dual-layer recordable (write-once) optical record carrier (in particular a DVD+R-DL record carrier) for recording information using a radiation beam 7 having wavelength $\lambda$ and incident on an entrance surface of the optical record carrier according to the present invention. For optical discs according to the DVD+R standard the wavelength in the vacuum ($\lambda$) equals 655 nm and numerical aperture (NA) of radiation beam incident on the optical record carrier is 0.65.

From top to bottom this record carrier 1 comprises the following layers:
- a substrate layer 2 forming a protective layer and facing the entrance surface,
- a first recording stack (L0), said recording stack comprising a recording layer 3 of an organic dye material and an associated metal reflective or heat-sink layer 4 which is semi-transparent,
- a transparent spacer layer 5 for separating the first recording stack L0 from a second recording stack L1,
- a second recording stack (L1) comprising a recording layer and an associated metal reflective or heat-sink layer (both not shown), and
- a second substrate layer 6.

All further calculation of depth, width and thickness were done having in mind that the refractive index of the substrate layers 2 and 5 ($n_S$) equals 1.58, whereas the refractive index of the recording layer ($n_r$) is 2.2.

Recording of data is done by emitting a radiation beam 7 from a light source (preferably a laser) which can be focused either on the first recording stack L0 or on the second recording stack L1 by appropriate focusing means (not shown). Due to the high transmission ratio of the first recording stack L0 a large part 8 of the light 7 received by the first recording stack L0 is transmitted to the second recording stack L1. To allow this the recording layer 3 is substantially made of a transparent organic dye material.

As can be seen for the first recording stack L0 the recording layer 3 shows a groove structure which is, for instance, achieved during production of the record carrier 1 by first providing a pre-grooved structure on the bottom side of the substrate layer 2 and then putting the organic dye material for the recording layer 3 on top. The groove structure exhibits grooves and lands between them. The material in the lands of the groove structure of the recording layer 3 is the substrate layer 2. It has been found that a decreased groove depth g, compared to the standard 160 nm, results in both an increase in reflection and an increase in transmission of the first recording stack L0. Down to a groove depth of 100 nm this hardly costs any modulation. A preferred groove depth for the first recording stack L0 is thus in the range from 100 to 150 nm (from $0.241*\lambda/n_S$ to $0.362*\lambda/n_S$), preferably from 120 to 140 nm (from $0.289*\lambda/n_S$ to $0.337*\lambda/n_S$).

In a particular embodiment the groove depth is selected to be 140 nm ($0.337*\lambda/n_S$), the groove width is 320 nm ($0.317*\lambda/NA$), the thickness of the recording layer is 80 nm ($0.268*\lambda/n_r$), the thickness of the metal reflective or heat-sink layer 4 (made of Ag in this embodiment) is 10 nm leading to a reflection of 18%, a transmission of 55% and a modulation of 80%. These values have been obtained by use of a recording beam focusing element having a numerical aperture (NA) of 0.65, a track pitch of 740 nm and a wavelength of the recording beam 650 nm.

In the embodiment shown in FIG. 1, in addition to the decrease of the groove depth, leveling of the recording layer 3 is applied. Leveling is defined as the difference in the thickness dg of the recording layer 3 at a groove position and the thickness dl of the recording layer 3 at a land position normalized by the grooved depth g, i.e. leveling is defined as (dg−dl)/g. It has been shown that an increase of leveling of the recording layer 3 in the first recording stack L0 can further increase reflection and transmission of the first recording stack L0. A preferred range for leveling is 30 to 50%, preferably 35 to 40%.

In a dual-layer record carrier as shown in FIG. 1 the decrease of the groove depth and, preferably, the increase of leveling is at least applied in the first recording stack L0.

However, it is also possible to apply the invention with groove depths and leveling ratios in a similar or the same range in the second recording stack L1. In a multi-layer record carrier the same holds. The invention can be either applied only in the top recording stack facing the light source emitting the radiation beam for recording, or in all recording stacks but the lowest recording stack being located on the opposite side of the light source, or even in all recording stacks.

Diagrams supporting the above described findings according to the present invention are shown in FIGS. 2 to 4. FIG. 2 shows the reflection (a), transmission (b) and modulation (c) for different L0 stack designs as a function of the groove depth for an optical record carrier according to the DVD+R standard. In all cases the thickness of the recording layer is taken to be 80 nm at a groove position, the leveling L is assumed to be 35% and the groove width w is taken to be 350 nm. It can be seen that, for different thicknesses of a metal reflective or heat-sink layer 4 which varies between 16 and 20 nm and can be made of Ag or Au, for all different stack designs a decreased groove depth, compared to the standard 160 nm groove depth, results in both an increase in reflection and an increase in transmission of the recording stack. Down to a groove depth of 100 nm this hardly costs any modulation.

FIG. 3 and FIG. 4 show the reflection (a), modulation (b) and transmission (c) as a function of the groove depth for different values of leveling L. For both diagrams a recording layer having a thickness of 80 nm at a groove position and a groove width of 300 nm is used. The thickness of the metal reflective and heat-sink layer is taken to be 16 nm of Ag for FIG. 3 and 20 nm of Au for FIG. 4. The same trends are observed for both stack designs (similar trends can also be observed for other stack designs): For an increased leveling the reflection increases in the range of practical groove depths, the transmission decreases in the same groove depth range, the optimum transmission shifts to shallower groove depths, the optimum modulation shifts to deeper grooves, the groove depth range for optimum modulation broadens and the maximum modulation decreases.

According to the present invention an increase of both reflection and transmission of at least the first recording stack L0 in a dual-layer or multi-layer write-once optical record carrier is achieved by decreasing the groove depth. A further increase in reflection and transmission can be obtained by increasing the recording layer leveling.

The invention claimed is:

1. Recordable optical record carrier for recording information using a radiation beam having wavelength λ and incident on an entrance surface of the optical record carrier comprising, in this order:
  a protective layer facing the entrance surface,
  a first recording stack (L0), said recording stack comprising a recording layer of an organic dye material and a groove structure,
  a transparent spacer layer sandwiched between neighboring recording stacks, and
  a second recording stack (LN) comprising a recording layer,
  wherein the groove depth of the recording layer of the first recording stack (L0) is in a range from $0.241*\lambda/n_S$ to $0.333*\lambda/n_S$, where $n_S$ is a refractive index of a material in a land between grooves on the groove structure, and wherein the refractive index $n_S$ is 1.58 and the wavelength λ is in a range of 650 nm-655 nm, and
  wherein a groove width of the recording layer of the first recording stack (L0) is in a range from 198 nm to less than 400 nm.

2. Record carrier according to claim 1, wherein the groove depth of the recording layer of the first recording stack (L0) is in a range from $0.289*\lambda/n_S$ to $0.333*\lambda/n_S$.

3. Record carrier according to claim 1, wherein the groove width of the recording layer of the first recording stack (L0) is in a range from $0.198*\lambda/NA$ to $0.396*\lambda/NA$, where NA is a numerical aperture of the radiation beam incident on the optical record carrier, and wherein the numerical aperture NA is 0.65.

4. Record carrier according to claim 3, wherein the groove width of the recording layer of the first recording stack (L0) is in a range from $0.289*\lambda/NA$ to $0.347*\lambda/NA$.

5. Record carrier according to claim 1, further comprising:
  at least one additional recording stack between the protective layer and the second recording stack (LN), said additional recording stack comprising a recording layer of an organic dye material and a groove structure and
  transparent spacer layers sandwiched between the neighboring recording stacks,
  wherein the groove depth of the recording layer of at least one of said additional recording stacks is in a range from $0.241*\lambda/n_S$ to $0.362*\lambda/n_S$.

6. Record carrier according to claim 5, wherein the groove depth of the recording layer of at least one of said additional recording stacks is in a range from $0.289*\lambda/n_S$ to $0.333*\lambda/n_S$.

7. Record carrier according to claim 5, wherein the groove width of the recording layers of at least one of said additional recording stacks is in a range from $0.198*\lambda/NA$ to $0.396*\lambda/NA$, where NA is a numerical aperture of the radiation beam incident on the optical record carrier, and wherein the numerical aperture NA is 0.65.

8. Record carrier according to claim 7, wherein the groove width of the recording layers of at least one of said additional recording stacks is in a range from $0.289*\lambda/NA$ to $0.346*\lambda/NA$.

9. Record carrier according to claim 1, wherein each recording stack further comprises a metal reflective or heat-sink layer arranged on the side of the recording layer facing away from the entrance surface.

10. Record carrier according to claim 9, wherein said metal reflective or heat-sink layers are substantially made of a material of the group consisting Ag, Al, Au or Cu.

11. Record carrier according to claim 9, wherein the thickness of said reflective or heat-sink layers is in a range below 40 nm.

12. Record carrier according to claim 9, wherein the thickness of said reflective or heat-sink layers is in a range below 25 nm.

13. Record carrier according to claim 1 wherein the thickness of the recording layer of at least one recording stack at a groove position is in a range from $0.168*\lambda/n_r$ to $0.336*\lambda/n_r$, where $n_r$ is a refractive index of the recording layer and is 2.2.

14. Record carrier according to claim 13 wherein the thickness of the recording layer of at least one recording stack at a groove position is in a range from $0.235*\lambda/n_r$ to $0.302*\lambda/n_r$.

15. Record carrier according to claim 1, wherein the recording layer of at least the first recording stack shows a leveling ratio in a range from 0.3 to 0.45, said leveling ratio being defined as the difference between the thickness of said recording layer at a groove position and the thickness of said recording layer at a land position normalized by the groove depth.

16. Record carrier according to claim 15, wherein the recording layer of at least the first recording stack shows a leveling ratio in a range from 0.35 to 0.40.

17. A recordable optical record carrier for recording information using a radiation beam having wavelength $\lambda$ and incident on an entrance surface of the optical record carrier comprising:
  a protective layer facing the entrance surface;
  a first recording stack, said recording stack comprising a recording layer of an organic dye material and a groove structure;
  a transparent spacer layer sandwiched between neighboring recording stacks; and
  a second recording stack comprising a recording layer, wherein a groove depth of the recording layer of the first recording stack is in a range from 100 nm to 138 nm, and wherein a groove width of the recording layer of the first recording stack (LO) is in a range from 198 nm to less than 400 nm.

18. The recordable optical record carrier of claim 17, wherein the recording layer of at least the first recording stack has a leveling ratio in a range from 0.3 to 0.45, said leveling ratio being defined as a difference between a thickness of said recording layer at a groove position and a thickness of said recording layer at a land position normalized by a groove depth.

19. A recordable optical record carrier for recording information using a radiation beam having wavelength $\lambda$ and incident on an entrance surface of the optical record carrier comprising:
  a protective layer facing the entrance surface;
  a first recording stack, said recording stack comprising a recording layer of an organic dye material and a groove structure;
  a transparent spacer layer sandwiched between neighboring recording stacks; and
  a second recording stack comprising a recording layer,
  wherein the recording layer of at least the first recording stack has a leveling ratio in a range from 0.3 to 0.45, said leveling ratio being defined as a difference between a thickness of said recording layer at a groove position and a thickness of said recording layer at a land position normalized by a groove depth, and
  wherein a groove width of the recording layer of the first recording stack is in a range from 198 nm to less than 400 nm.

20. The recordable optical record carrier of claim 19, wherein the groove depth of the recording layer of the first recording stack is in a range from 100 nm to 138 nm.

* * * * *